(12) United States Patent
Waitz

(10) Patent No.: US 9,225,894 B2
(45) Date of Patent: Dec. 29, 2015

(54) METHOD AND DEVICE FOR FOCUSING A FILM CAMERA

(76) Inventor: Martin Waitz, Vienna (AT)

( * ) Notice: Subject to any disclaimer, the term of this patent is extended or adjusted under 35 U.S.C. 154(b) by 188 days.

(21) Appl. No.: 14/006,101

(22) PCT Filed: Mar. 19, 2012

(86) PCT No.: PCT/EP2012/054754
§ 371 (c)(1),
(2), (4) Date: Sep. 18, 2013

(87) PCT Pub. No.: WO2012/126868
PCT Pub. Date: Sep. 27, 2012

(65) Prior Publication Data
US 2014/0009665 A1  Jan. 9, 2014

(30) Foreign Application Priority Data

Mar. 18, 2011 (AT) .................................. A 391/2011

(51) Int. Cl.
*G03B 13/36* (2006.01)
*H04N 5/232* (2006.01)
*G02B 7/28* (2006.01)
*G03B 13/20* (2006.01)

(52) U.S. Cl.
CPC ............ *H04N 5/23212* (2013.01); *G02B 7/285* (2013.01); *G03B 13/20* (2013.01); *G03B 13/36* (2013.01)

(58) Field of Classification Search
CPC .... H04N 5/23212; G02B 7/285; G03B 13/20; G03B 13/36
See application file for complete search history.

(56) References Cited

U.S. PATENT DOCUMENTS

| 3,940,777 | A | * | 2/1976 | Komine ......................... 396/85 |
| 4,404,595 | A | * | 9/1983 | Ushiro et al. ................. 348/357 |
| 4,827,303 | A | * | 5/1989 | Tsuboi .......................... 396/123 |
| 5,092,670 | A |   | 3/1992 | Preston |
| 7,899,315 | B2 | * | 3/2011 | Chou et al. ...................... 396/77 |
| 2014/0009665 | A1 | * | 1/2014 | Waitz ............................ 348/350 |

FOREIGN PATENT DOCUMENTS

| EP | 1084437 B | 6/2002 |
| JP | 2006074634 A | 3/2006 |
| WO | 9963378 A1 | 12/1999 |
| WO | 20090133095 A | 11/2009 |
| WO | 2010150177 A1 | 12/2010 |

* cited by examiner

*Primary Examiner* — W B Perkey
(74) *Attorney, Agent, or Firm* — Jordan IP Law, LLC; Todd A. Vaughn

(57) ABSTRACT

A method for focusing a film camera, in which at least one auxiliary camera is provided for producing an auxiliary representation of an object to be recorded, from which the desired focus setting is determined and a focusing signal is delivered to the film camera.

18 Claims, 1 Drawing Sheet

METHOD AND DEVICE FOR FOCUSING A FILM CAMERA

CROSS-REFERENCE TO RELATED APPLICATIONS

Figure 1:
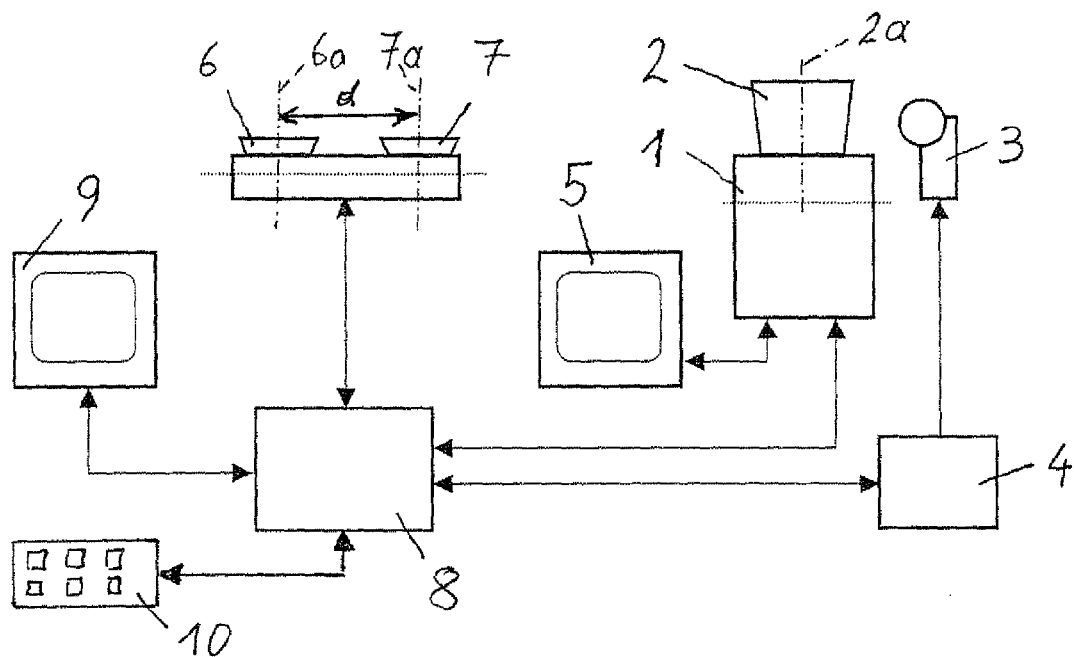

The present application is a National Stage Application of PCT International Application No. PCT/EP2012/054754 (filed on Mar. 19, 2012), under 35 U.S.C. §371, which claims priority to Austrian Patent Application No. A 391/2011 (filed on Mar. 18, 2011), which are each hereby incorporated by reference in their respective entireties.

TECHNICAL FIELD

The invention relates to a method for focusing a film camera, in which at least one auxiliary camera is provided for producing an auxiliary representation of an object to be recorded, from which the desired focus setting is determined and a focusing signal is delivered to the film camera.

BACKGROUND

Different lenses are used for the various filming conditions depending on the application. Lenses are routinely continuously changed on the film camera during filming. Lenses can have three adjustment axes: focus, aperture, and zoom adjustment axes. Each adjustment axis has a scale, which is provided with engraved values by the lens producer. A marking indicates the currently set value.

Flanging servomotors onto the pinion of the adjustment axis on the lens is known for focusing on a motif, or for setting the aperture or the zoom region of film cameras. The activation of the individual servomotors is performed via a focusing unit, which is often embodied as a separate device. However, the focusing unit can also be integrated in the servomotor. It is also the case that the servomotor and/or the focusing unit are integrated in the lens, or are fastened as a joint unit on the lens.

It is possible for the operator to predefine setpoint positions of the focusing unit with the aid of one or more manual control units. The devices are connected via cable or radio connections. Finally, the servomotor processes the preset and adjusts the graduated ring on the lens.

Manual control unit, focusing unit, and servomotor form the lens control system of a film camera.

In the case of the recording of films, in particular the correct focusing of the film camera is a critical task. In particular in the case of artistically worthwhile films, a low depth of field is very often used, in order to emphasize specific objects or persons or the parts thereof accordingly. It is prior art that the lens control system can be assisted by further auxiliary devices especially during the focusing.

One possibility for focusing is, for example, is to aim at the object to be focused using a laser-based distance meter or an ultrasonic measuring device and to obtain the focusing information for the film camera therefrom. This has the disadvantage that in the case of moving objects, continuous tracking is necessary and in many cases the spatial relationship between film camera and distance meter is also not unambiguous. A further disadvantage is that these measuring devices only measure the distance from one specific point in space.

The data must be exchanged between these individual devices. In the case of rapidly moving objects, there is a trailing effect of the focus motor, since a large amount of time delay occurs due to the data exchange and the separate processing of data. Following very rapid objects is thus not possible.

A method and a device for focusing a film camera are known from EP 1 084 437 B, in which auxiliary cameras are used, which are provided laterally adjacent to the actual film camera. These auxiliary cameras are arranged so they are pivotable, so that the optical axes can be aligned onto the object to be focused. By triangulation, the distance to this object is calculated and the signal for the focusing is obtained. This system has the disadvantage that the mechanical movement of the auxiliary camera is susceptible to failure and even slight tolerances in the pivot movement, in particular in the moderate distance region, can result in large irregularities in the distance determination. In the event of a lens change, the system is to be recalibrated.

The above problems are partially solved by the use of a camera as described in WO 2009/133095 A. An auxiliary representation, which can be used to obtain items of distance information, is generated by an auxiliary sensor attached to a camera. However, this has the disadvantage that it is not readily possible to perform a distance measurement before a recording without using the camera, and the distance measurement is always dependent on the respective lens used, which is fitted on the camera. The calibration of the distance measurement is also only possible with the camera in the respective present state in the case of the known solution.

Independently of the fact that the lens must be changed very often in the case of film cameras, the following problem exists: real optics for film cameras pump, i.e., the image detail (the focal length) changes during focusing, a constant relationship of the image details is thus not provided between the two cameras. To calculate a depth image, however, the imaging scales and therefore the image details of all participating cameras are to be known precisely. In the case of zoom optics, the general problem exists of knowing the current precise focal length region. Most optics for film cameras do not have installed electronics, which output the scale setting and the focal length region.

A further problem is that real optics for film cameras, above all zoom optics, change the optical axis during zooming, or change the optical axis as a function of how the optic is installed on the camera. Therefore, a parallel alignment of the optical axes is only possible in reality by way of a very high level of effort, since the entire camera (camera including optic) must be moved during zooming. These two deviations (pumping and traveling of the optical axis) would have to be predefined by an algorithm for depth calculation and are different in every optic. The measurement is imprecise or is not even possible without these values.

However, the greatest problem during filming is the following: film recordings often have a low desired depth of field. In essence, the imaging of the main camera is fuzzy in large subregions. A depth calculation cannot occur in fuzzy image regions, i.e., the main camera can only be used for calculating a stereoscopic imaging if the depth of field is very large.

A less relevant, but nonetheless often interfering effect is that color images are less suitable for a depth calculation (above all, one which is to be executed in real time) and deliver comparatively imprecise results. Therefore, images from grayscale cameras are preferably used for the depth calculations.

SUMMARY

The object of the present invention is to avoid these disadvantages and to specify a method, using which a reliable distance signal for focusing the film camera can be obtained in a simple and robust manner. In particular, the distance determination is to be made as independent as possible from the actual camera.

These objects are achieved in accordance with the invention in that the auxiliary camera is detachably connected to the film camera and outputs the focusing signal to a servomotor, which is attached to the film camera, or to a lens controller.

A monitor is preferably provided for displaying the auxiliary representations, which preferably also allows a superposition of a plurality of auxiliary representations.

Auxiliary representation means in this context the real image of an auxiliary camera, from which a depth image is calculated.

It is therefore particularly preferable to use two auxiliary cameras, which produce at least two auxiliary representations, from which a distance value is calculated for a plurality of pixels. The auxiliary cameras can be optimized for the production of auxiliary representations, which are optimized for the depth calculation, in that they work with a strongly closed aperture, for example, to achieve a large depth of field. This allows the implementation of greater design freedom, since it is possible to select a displayed object at any time on the monitor, which is to be focused on, even if it is far outside the sharp region at the moment of selection and therefore is displayed extremely fuzzy in the actual representation.

Without endangering the above advantages, if the spatial assignments, the optical properties of the lenses used, and the tolerances are known, the video image of an auxiliary camera can be incorporated into the image of the video camera, so that the motif selection can also be performed via the image of the film camera.

In the image calculation unit, it is possible to detect the distance of a plurality of motifs simultaneously. These regions or motifs can be defined before the filming. The resulting distance values can be transmitted in numbered form for the focus setting of the film camera. It is therefore possible to change very easily (for example, by button press) between various motifs using the focus setting and to focus on these distances, without the display unit having to be observed or operated. The operator can better concentrate during the filming on the action in front of the camera. He must only operate the focus setting, which he does anyway. He can nonetheless use the advantages of an automatic distance measurement.

In addition to the active measurement of a distance value by the user, the system is also suitable for semiautomatic or automatic passive distance measurement. The following methods are applied:

restricting the region of the auxiliary representation;
setting distance limits to blank out undesired obstructions (such as columns);
setting focus ramps/panning: Two or more regions can be marked on the monitor (having different items of distance information), between which, in a fixed time span, the focus passes from region n to region n+1 in a ramp function.
representation of the depth of field region (focus region of the film camera) in the auxiliary representation;
automatic distance measurement at a fixed point (for example, center point of the auxiliary representation);
automatic measurement of the closest point in the auxiliary representation or in a defined region of the auxiliary representation;
instead of the closest distance, another criterion can be predefined, for example:
average distance over all measured points in the defined measuring field region;
average distance in accordance with a specific weighting and distribution method of the measured points (for example, exclusion of extremely close and/or distant measured values);
farthest distance point;
motif tracking, facial field tracking: automatic tracking of motifs;
pattern recognition: criteria of the measuring region are predefined features (such as colors, contours, etc.).

All of these methods can also be used in such a manner that only one distance value is specified. The user can also use the values as a decision aid for the focus setting here.

An essential feature of the present invention is the fact that a rigid arrangement of the auxiliary camera or of the auxiliary camera and optionally the film camera is provided, wherein preferably the optical axes of all cameras are aligned in parallel to one another. Of course, the image of the auxiliary camera differs because of the parallax as a function of the distance of the recorded objects. It is now possible by way of pattern recognition to identify a specific object in the auxiliary representation and to determine the optical shift. It is possible to conclude the distance to the relevant object therefrom. This distance signal is output as a focusing signal to the film camera.

Alternatively, the auxiliary camera can be implemented as a TOF camera. Cameras of this type determine the runtime of the camera from or to the object, which also explains the designation (runtime camera, time of flight camera). A distance signal is determined and also delivered for every pixel of the camera.

Pattern recognition is the capability of a method to recognize regularities, similarities, or rules in a set of image data.

It is prior art that three principal approaches are followed and implemented in pattern recognition. These are syntactic, statistical, and structural pattern recognition.

In syntactic pattern recognition, things are described by sequences of symbols. These can be, for example, the colors or specific contours. The goal of syntactic pattern recognition is to find objects of the category which have these descriptions.

In statistical pattern recognition, the probability is determined that an object belongs in one or another category, in order to then assign it to the category having the highest probability. Instead of analyzing features in accordance with prefinished rules, the measured numeric values are combined to form pattern vectors. A mathematical function assigns a category unambiguously to every conceivable pattern vector.

Structural pattern recognition combines various approaches of the syntactic and statistical methods to form a new method. One example is the facial field recognition, which is important here, and in which different classification methods are used for various parts of the face such as the eyes and nose, which respectively only state whether or not the desired body part is present. Higher-order structural methods combine the individual results and calculate a result therefrom, the category affiliation. It is therefore possible to identify one or more faces in images and to track them in the case of moving images.

Monitoring and control of the focusing is in particular possible in that the auxiliary representations are displayed on a monitor, and preferably superposition of a plurality of auxiliary representations is also made possible. The person responsible for the focusing can therefore monitor the system and easily identify sharp and fuzzy regions on the basis of the superposition. However, it is also possible to specify specific marked regions, which are to be focused on.

The current focusing signal is used to superimpose the auxiliary representations of at least two cameras, in such a manner that the region which corresponds to the distance region of the film camera is brought precisely into correspondence/superposition. Regions in the auxiliary representation which correspond to the distance region are to be seen clearly. Regions which do not overlap are not in the focus region and are also visible imprecisely in the auxiliary representation as images shifted to one another. The operator can thus see in the representation which region was focused on.

It is particularly advantageous if, in the auxiliary representations, the region recorded by the film camera is marked by a frame, for example, if the auxiliary representations are not brought into correspondence with the recorded region by corresponding processing. For this purpose, the image region of the film camera is overlaid in the auxiliary representation.

It is particularly efficient if the auxiliary representations are resolved into pixels or pixel groups, and a distance value is stored for each pixel or each pixel group by the stereoscopic shift of the auxiliary representations. The recording system therefore has an item of distance information, which can be used for the focusing, for each part of the image. Therefore, in particular also complex focusing strategies can be specified. It can thus be established in this manner that the closest object is to be focused on, with the exception of objects whose distance is less than a specific limiting value, or with the exception of objects which are located in a specific image region. This is advantageously applicable if the person situated closest to the camera is to be focused on, but it is to be expected that a nearby column comes into the field of vision.

It is also possible to apply various averaging methods for the focusing, for example, the calculation of weighted averages. Thus, for example, the average distance of all pixels in the specific region can be focused on, wherein, however, pixels which are particularly close or particularly far away are only taken into consideration with a low weight in the averaging or are not used at all to calculate the distance average. In a similar manner, it can also be specified that only pixels are considered which have a similar distance in a coherent region having a specific minimum size.

The operator can select a pixel on the monitor, from which the corresponding distance value is transmitted to the lens controller directly by the underlaid depth image. This selection can be executed via mouse control, touchpad, or the like.

A particularly favorable embodiment variant of the method in accordance with the invention provides that an object to be recorded is identified by an operator for carrying out the focusing. This can be a picture hanging on the wall, for example, which is always focused on independently of whether the camera moves toward the object or pivots. This method variant is particularly advantageously applicable, however, if moving objects, for example, vehicles or persons, are to be focused on over a specific period of time. By way of a facial field recognition, a face can be localized in space, and this face can be followed. However, it is also possible, for example, in a large-scale recording having low depth of field, to set the distance to the eyes of the relevant person.

This method variant uses known algorithms, which are capable of detecting predefined objects or patterns on images. In combination with the above-described algorithms, however, the distance of a plurality of objects can also be determined simultaneously and a derived focusing value, for example, a mean value, can be calculated therefrom. Or the distance value can be transferred between the objects in a time span to be specified, in order to thus implement a focus ramp.

Preferably, at least one auxiliary representation is output on a display unit, on which items of information about the focusing are also output. This means that a depth image calculated from the auxiliary representations is output, in that, for example, a false color representation is displayed, in which the color expresses the specific distance to the respective object. A specific red tone then corresponds, for example, to a distance of 1 m, while a specific blue denotes infinite.

Real image and depth image can be displayed adjacent to one another. In addition, the image of the film camera can be displayed, so that the operator can also observe the real image of the film camera and sees which object is focused on, or how the image detail of the film camera is. Furthermore, it is possible to display the image from each auxiliary camera. It is possible to switch over between these views, or these representations can be displayed superimposed.

In the image calculation unit, it is possible to detect the distance of a plurality of motifs simultaneously. These regions or motifs can be defined before the filming. The resulting distance values can be transmitted in numbered form to the focus setting of the film camera. It is therefore possible to change very easily (for example, by button press) between various motifs using the focus setting and to focus on these distances without having to observe or operate the display unit. The operator can better concentrate on the action in front of the camera during the filming. He must only operate the focus setting, which he does in any case. He can nonetheless use the advantages of an automatic distance measurement, however.

After every change of the lens, the motors for controlling the adjustment axes are to be recalibrated, so that they do not drive onto the mechanical stop of the lens. During the calibration procedure, the motor approaches the mechanical stops at low velocity and simultaneously ascertains the possible adjustment travel. Each lens has an adjustment travel which differs more or less. If a table having an assignment between motor rotation travel to scale position is stored in the focusing unit, after the calibration travel, the scale position and therefore the set focus value of the lens is known to the system. In the normal case, this assignment table is not known and is also not stored in the motor activation system because of the variety of different optics. Therefore, it is possible in the arrangement described in accordance with the invention to store various lens tables in the image calculation unit and to select the correct table after a change of the lens, so that the scale position and therefore the focus value can be specified to the lens control system.

Because of the variety of the different lenses, applying and storing lens tables is cumbersome and complex. Therefore, an assignment table having few support points can easily be recalibrated after a lens change. The closest scale value and infinite are known after the calibration of the motor. Intermediate points are approached on the lens and the corresponding distance value is input. An assignment table having arbitrary support points can thus easily be applied and stored.

If easily identifiable objects (e.g., simple contours) are present for a pattern recognition, this calibration procedure of a lens can thus also be automated. For this purpose, the real image of the film camera and an auxiliary representation must be supplied to the image calculation unit. A low depth of field is set via the aperture. The focus motor is automatically slowly rotated, so that only objects in the corresponding distance are imaged sharply in the image of the film camera. These images are compared to the auxiliary representation and studied for shared patterns. If the pattern can be identified, the corresponding focus value of the lens of the film camera is known to the system on the basis of the existing items of depth information of the auxiliary representation. Therefore, one or many support points of an assignment table can be stored as rotation travel of servomotor to distance value.

It has proven to be particularly advantageous if the current focusing signal and the region of the depth of field are transmitted to the image calculation unit. The current focusing signal is the distance value on which the lens is currently focused and is known to the focusing unit, if the assignment table of rotation travel of servomotor to distance value is stored. The depth of field results from the physics of the optic and is the region where an image is sharply imaged. Using these distance values, it is possible to mark by color or blank out entirely image regions in the auxiliary representation which are outside the depth of field region. This is easily possible, since the pixels or pixel groups of the auxiliary representation are stored with distance values. If the operator changes the focus, the auxiliary representation also changes. The operator can thus easily recognize the spatial region in which the focal plane or the sharp region lies.

Furthermore, the present invention relates to a device for focusing a film camera, having at least one auxiliary camera, which generates an auxiliary representation, and having an image calculation unit, which is connected to the auxiliary camera, on the one hand, and activates a focusing unit of the film camera, on the other hand.

In accordance with the invention, this device is characterized in that the auxiliary camera is detachably connected to the film camera.

A plurality of auxiliary cameras can be used for the measurement. All auxiliary cameras are calibrated to one another. A plurality of auxiliary cameras has the advantage that the shading of regions in space is minimized or the measuring region can be changed very easily.

The auxiliary cameras are preferably fixedly connected to one another and particularly preferably also fixedly, but removably, connected to the film camera, wherein the image calculation unit calculates the focusing signal on the basis of a pattern recognition of the auxiliary representations.

Fundamentally, the method in accordance with the invention can be executed using auxiliary cameras which are fixedly connected to one another, but are independent of the film camera. In this case, the distance and the different alignment of film camera, on the one hand, and auxiliary cameras, on the other hand, must be precisely detected and considered during the focusing, to compensate for the parallax errors. However, it is simpler and more efficient if the auxiliary cameras are fixedly, but detachably, connected not only to one another but rather also to the film camera, in that they are arranged laterally on both sides of the film camera, for example. The optical axes of all cameras are particularly preferably parallel to one another, which accordingly makes it easier to carry out the calculations.

If the image plane, i.e., the region in which the optic images sharply, of the film camera and the auxiliary camera is shifted, this offset can be calculated into every measured value by a simple offset specification.

The calculation of the depth image is performed in the image calculation unit, which can form a unit with the monitor, but can also be detached from the auxiliary monitor. To achieve great operating flexibility, the auxiliary monitor can be connected to the measuring device and the lens control unit via wire or radio. Image calculation unit and auxiliary monitor can also consist of one unit, however.

Auxiliary camera and image calculation unit can also output distance values without specification by an auxiliary monitor, if calculation parameters are set at an input unit. One calculation parameter can be to use the closest measuring region of the auxiliary representation. Or the measuring region of the optical mean of an auxiliary camera can be output.

Focusing unit and image calculation unit can preferably be unified in one system, wherein the servomotor for the lens is connected to the image calculation unit. The delay times are thus minimized in this closed system. The servomotor can react very rapidly to distance changes and it is possible to follow very rapid object movements.

In order to have corresponding items of information available during the postprocessing, the auxiliary representation can be stored in a memory. In this manner, the respective items of information are also still available for the actual image, which can be used for later 3-D postprocessing, for example.

It is possible per se to assign the items of distance information pixel by pixel to the individual pixels. In order to reduce the data quantity, however, the pixels can also be grouped, in that only one distance value is assigned to one group of 4×4 pixels at a time, for example. In this manner, it is possible to substantially reduce the computing effort and thus increase the focusing speed at given computing capacity. This is advantageous in particular if the method is to be operated such that the respective closest object is focused on.

Furthermore, the invention also relates to a device for focusing a film camera, having at least one auxiliary camera which generates an auxiliary representation, and having an image calculation unit, which is connected to the auxiliary camera, on the one hand, and activates a focusing unit of the film camera, on the other hand. According to the invention, this device is characterized in that the auxiliary camera is detachably connected to the film camera.

It is particularly preferable in this context if at least two auxiliary cameras are arranged offset to one another in the vertical direction in the usage position. In the case of a recording of images which are offset in parallax, shading occurs, of course, i.e., there are regions of the recorded objects which are only detected by one camera, but not by the other. If two auxiliary cameras are arranged laterally offset to one another, then respectively only one ear is completely detected by one auxiliary camera in the case of a person recorded frontally from the front, for example. It has been shown that this shading can represent problems for the focusing in specific situations. These problems can be substantially reduced by a position of the auxiliary cameras arranged vertically one over the other, since shading on the top side or bottom side of recorded objects typically does not interfere.

DRAWINGS

The present invention is explained in greater detail hereafter on the basis of the exemplary embodiments illustrated in the figures.

Figure 2:
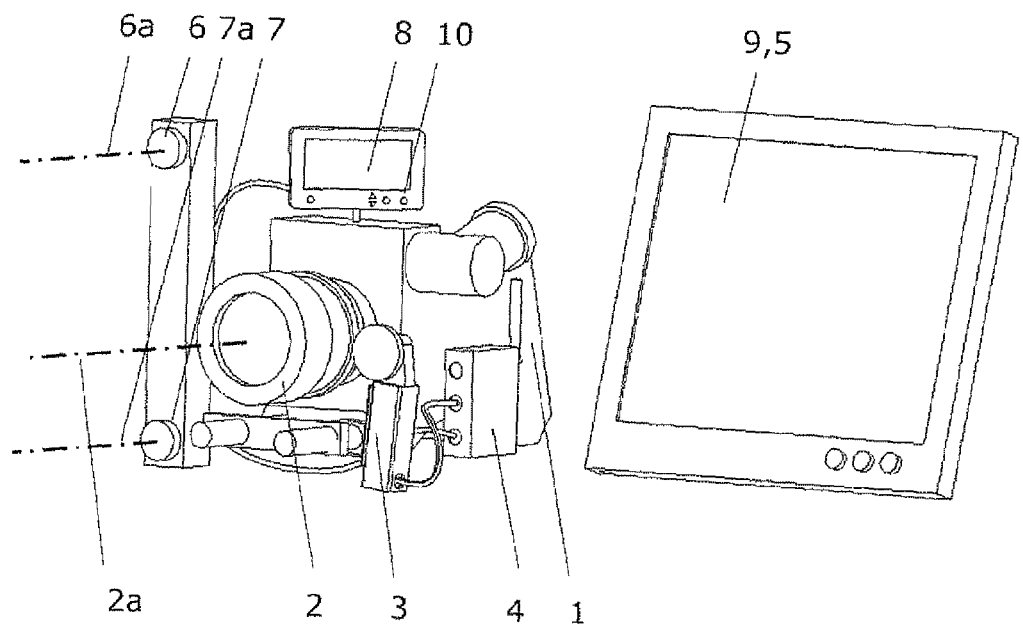

FIG. 1 schematically illustrates the structure of a device in accordance with the invention; and FIG. 2 illustrates an embodiment variant of the invention in an axonometric view.

DESCRIPTION

A film camera 1 of FIG. 1 is provided with a lens 2, which has an optical axis 2a. A servomotor 3 is attached to the lens 2, in order to carry out the focus setting. The servomotor 3 is activated by a focusing unit 4. A monitor 5 is provided in a known manner, to display the image recorded by the film camera 1.

In the front below the film camera 1, two auxiliary cameras 6, 7, which are fixedly connected to one another, are arranged, which have optical axes 6a or 7a, respectively, which are parallel to one another. The auxiliary cameras 6, 7 are either fixedly attached to the film camera 1 or measuring units (not illustrated), such as position measuring sensors are provided, to determine the relative position of the film camera 1 with respect to the auxiliary cameras 6, 7. The auxiliary cameras 6, 7 feed their image into an image calculation unit 8, which calculates the respective distance for the individual pixels on the basis of the different items of image information of the two auxiliary cameras 6, 7 and the spacing d between the optical axes 6a and 7a. The images recorded by the auxiliary cameras 6, 7 are displayed in superimposed form on a further monitor 9, which forms the display unit. An input unit 10 is used for the purpose of operating the image calculation unit 8.

In the image calculation unit 8, the images of the auxiliary cameras 6, 7 are analyzed and the above-described pattern recognition is carried out. Simultaneously, the calculations specified by the operator are carried out, which finally result in the items of focusing information, which are relayed to the focusing unit 4.

It is apparent from FIG. 2 that the two auxiliary cameras 6, 7, whose axes 6a and 7a, respectively, are arranged at the spacing d, are attached vertically one over the other laterally adjacent to the actual film camera 1. The designation vertically relates to the usage location, which is defined by the horizontal location of the longer side of the recorded image.

Furthermore, a single monitor 5, 9 is provided here, which can be switched over between various display modes.

The present invention allows the precision and reliability of the focusing during film recording to be substantially enhanced.

What is claimed is:

1. A method for focusing a film camera, comprising:
   producing two auxiliary representations of an object to be recorded using two auxiliary cameras which are removably connected to the film camera, the two auxiliary representations being produced from which a distance value is calculated for a plurality of pixels;
   determining a desired focus setting and delivering a focusing signal to the film camera based on the auxiliary representation; and
   outputting the focusing signal to a servomotor attached to the film camera.

2. The method of claim 1, wherein the two auxiliary representations are offset to one another in a vertical direction.

3. The method of claim 1, further comprising:
   displaying the two auxiliary representations on a monitor as a display unit; and
   creating a superposition of a plurality of auxiliary representations.

4. The method of claim 1, further comprising outputting two auxiliary representation on a display unit and also items of information about the focusing.

5. The method of claim 4, further comprising marking image regions within or outside a depth of field region on the display unit.

6. The method of claim 1, further comprising:
   resolving the two auxiliary representations into pixels or pixel groups; and
   storing a distance value for each pixel or each pixel group, respectively.

7. The method of claim 1, further comprising inputting, by an operator, a region from which the focusing signal is calculated.

8. The method of claim 1, further comprising inputting, by an operator, an object to be recorded, with respect to which a pattern recognition is carried out.

9. The method of claim 1, further comprising calibrating a servo-drive which carries out the focusing, after one of assembling the film camera and the two auxiliary cameras, and changing the lens of the film camera.

10. The method of claim 9, further comprising transmitting a current focusing signal or the region of a depth of field to a calculation unit.

11. The method of claim 10, wherein calibrating the servo-drive comprises:
    slowly adjusting the servo-drive and simultaneously identifying sections which are imaged sharply by the film camera;
    comparing the sections to the auxiliary representations in order to determine a respective focus value by pattern recognition; and
    storing the respective focus value in an assignment table in relation to a rotational value of the servo-drive.

12. The method of claim 11, wherein the focusing signal is calculated by pattern recognition, and is determined as a distance to a closest point.

13. A device for focusing a film camera, comprising:
    two auxiliary cameras detachably connected to the film camera and which generate two auxiliary representations from which a distance value is calculated for a plurality of pixels, the two auxiliary cameras being arranged offset to one another in a vertical direction in a usage location; and
    an image calculation unit which is connected to the film camera and which drives a focusing unit of the film camera.

14. The device of claim 13, wherein an optical axis of the two auxiliary cameras are parallel to an optical axis of the film camera.

15. The device of claim 13, further comprising:
    a display unit which outputs the two auxiliary representations; and
    an input unit which selects a region which is used to calculate a focusing signal, wherein the region is displayed on the display unit.

16. The device of claim 15, wherein the image calculation unit carries out a pattern recognition to calculate the focusing signal.

17. The device of claim 13, wherein the two auxiliary cameras are Time of Flight (TOF) cameras.

18. A device comprising:
    a film camera which includes a lens unit;
    two auxiliary cameras, independent of the film camera and the lens unit, removably connected to the film camera, and which produce two auxiliary representations of an object to be recorded;
    an image calculation unit, which receives the auxiliary representations and activates a focusing unit of the film camera based on the received auxiliary representations; and
    a servo motor connected to the focusing unit, and which controls a focus setting of the lens unit based on a signal from the focusing unit.

* * * * *